Patented Feb. 2, 1932

1,843,862

UNITED STATES PATENT OFFICE

HYYM E. BUC, OF ROSELLE, NEW JERSEY, ASSIGNOR TO STANDARD OIL DEVELOPMENT COMPANY, A CORPORATION OF DELAWARE

PROCESS OF REACTING UPON GASES IN AN INERT MENSTRUUM

No Drawing.    Application filed August 26, 1926. Serial No. 131,812.

This invention relates to improvements in processes of the type in which reaction between a gas and a reactive liquid is carried out in the presence of an inert liquid menstruum capable of absorbing or dissolving the gas. The invention is particularly adapted for use in connection with processes in which olefins are reacted upon by sulfuric acid in admixture with hydrocarbon oil. I have found that this reaction is facilitated to a marked degree by the presence of a small percentage of a substance that lowers the interfacial tension between the two liquids, or more specifically the interfacial tension between the liquids, thereby permitting emulsification and better contact between the reagents.

The invention will be fully understood from the following illustrative example:

Olefin-containing gases, such as gases from petroleum cracking apparatus, are passed into the lower portion of an absorption tower and flow upwardly through baffle plates or other contact means therein. Sulfuric acid, preferably of about 64.5° Bé., and gas oil, are supplied at the upper portion of the tower and flow downward through it in countercurrent to the gas. Without restricting myself to any particular theory of reaction, it may be said that the olefin-containing gases appear to be absorbed more or less completely by the oil, in which medium the sulfuric acid reacts upon them to form alkyl sulfuric acid esters.

According to my invention, about 0.5%, by weight, of Turkey red oil (sulfonated castor oil) is mixed with the gas oil or acid. The Turkey red oil reduces the interfacial tension between the gas oil and acid and tends to produce a mobile emulsion of the gas oil and the sulfuric acid. The latter is able to reach and react with a high proportion of the olefins because of the extended area of contact provided by the emulsification.

The emulsion is formed as the mixed liquids flow down through the baffle means in the tower. This mode of preparing the emulsion is preferred, although it may be preliminarily formed in the mixed liquids, which are then introduced into the tower.

The alkyl sulfuric acid esters formed from olefins by reaction with sulfuric acid, as described, are separated from the gas oil and hydrolyzed to produce alcohols in the well-known manner. The gas oil may be recycled for further use in the absorption of olefins. An additional quantity of Turkey red oil may be added to maintain the efficiency of the mixture.

The interfacial-tension-reducing reagent added to the oil or acid for facilitating reaction is preferably Turkey red oil, but sulfonated vegetable oils, sulfonated oleic acid, or sulfonate soaps from the manufacture of petroleum white oils, may also be successfully used. The reagent may be added in preformed condition, or may be produced in the reaction medium itself.

Compounds such as oleic acid or castor oil will serve. I may in fact use any suitable interfacial-tension-reducing agent which is either substantially unaffected by the sulfuric acid or yields a sulfuric acid reaction product having interfacial-tension-reducing properties. In some cases it is possible to obtain the advantages of the invention by the selection of an inert oil menstruum which contains an adequate amount of sulfonatable compounds.

The proportion of the Turkey red oil or other agent may be varied considerably, but care should be taken not to use so much as to form a stiff emulsion or gel, since reaction is slow in such a medium.

It will be understood that the foregoing description is illustrative of a preferred form of the invention, and that various changes and alternative procedures may be made within the scope of the appended claims in which it is my intention to claim all novelty inherent in the invention as broadly as the prior art permits.

I claim:

1. In the process of reacting upon a gas with a reactive liquid in admixture with a substantially inert liquid absorbent for the gas, the improvement which comprises carrying out the reaction in the presence of a substance which lowers the interfacial tension between said liquids.

2. Process according to claim 1, in which the interfacial-tension-reducing agent is a sulfonated oil.

3. In the process of reacting upon an olefin-containing gas with sulfuric acid in admixture with a hydrocarbon oil capable of dissolving olefins, the improvement which comprises carrying out the reaction in the presence of a substance which lowers the interfacial tension of the oil and the acid.

4. Process of esterifying olefins, which comprises introducing an olefin-containing gas into the lower portion of an absorption zone, flowing downwardly through such zone a mixture of sulfuric acid, an oil, and a reagent capable of lowering the tension of the interface between such liquids, and causing said gas and mixture to come into intimate contact in the absorption zone.

5. In the process of reacting upon an olefin-containing gas with sulfuric acid in admixture with a hydrocarbon oil capable of dissolving olefins, the improvement which comprises carrying out the reaction in the presence of a small percentage of a sulfonated oil insufficient in quantity to form a stiff gel.

6. In the process of reacting upon a gas with a reactive liquid in the presence of an inert liquid absorbent for the gas, the improvement which comprises carrying out the reaction in the presence of about 0.5% by weight of Turkey red oil.

7. Process of esterifying olefins, which comprises introducing an olefin-containing gas into the lower portion of an absorption zone, and flowing downwardly through such zone a mixture of sulfuric acid, a hydrocarbon oil and a small percentage of Turkey red oil insufficient in quantity to form a stiff gel of oil and acid.

8. Process according to claim 7, in which sulfuric acid of about 64.5° Bé., and gas oil containing about 0.5% by weight of Turkey red oil are used.

HYYM E. BUC.